United States Patent
Popp et al.

[19]

[11] Patent Number: 5,911,550
[45] Date of Patent: Jun. 15, 1999

[54] SELF-CUTTING DOWEL

[75] Inventors: Franz Popp, Buchloe; Stefan Raber, Kaufering, both of Germany

[73] Assignee: Hilti Aktiengesellschaft, Schaan, Lithuania

[21] Appl. No.: 08/991,242

[22] Filed: Dec. 16, 1997

[30] Foreign Application Priority Data

Dec. 16, 1996 [DE] Germany ............................ 196 52 278

[51] Int. Cl.[6] ...................................................... F16B 13/04
[52] U.S. Cl. .................................................. 411/30; 411/55
[58] Field of Search .................................. 411/29–31, 54, 411/55, 57, 60

[56] References Cited

U.S. PATENT DOCUMENTS

| | | | |
|---|---|---|---|
| 2,707,897 | 5/1955 | Beeson ....................................... | 411/60 |
| 3,200,692 | 8/1965 | Catlin ......................................... | 411/30 |
| 4,702,654 | 10/1987 | Frischmann et al. . | |
| 4,984,945 | 1/1991 | Bergner . | |
| 5,529,449 | 6/1996 | McSherry ................................... | 411/31 |

FOREIGN PATENT DOCUMENTS 21381349  12/1972  France .

OTHER PUBLICATIONS

Communication of Mar. 12, 1998, Application No. 97810942.9 to applicant Hilti Aktiengesellschaft from European Patent Office, The Hague.

*Primary Examiner*—Flemming Saether
*Attorney, Agent, or Firm*—Anderson, Kill & Olick, P.C.

[57] ABSTRACT

A self-cutting dowel including a dowel rod (2) having a head portion (3) which widens in a setting direction (S), and a sleeve (5) displaceable along the dowel rod (2) and having, at its end adjacent to the head portion (3) a plurality of expansion tabs (7) separated by longitudinal slots (6), with the sleeve (5) being displaceable onto the head portion (3) upon radial expansion of the expansion tabs (7), and with the sleeve (5) being displaceable onto the head portion (3) upon radial expansion of the expansion tabs (7), and with the sleeve (5) being provided with at least one cutter (10) for forming an under cut in a ground during a dowel setting process upon rotation of the sleeve (5), the at least one cutter (10) being provided on a leading, in a rotational direction (R), longitudinal edge (11) of one of the expansion tabs (7) and extending at least along a portion of the axial extent of the one expansion tab.

10 Claims, 2 Drawing Sheets

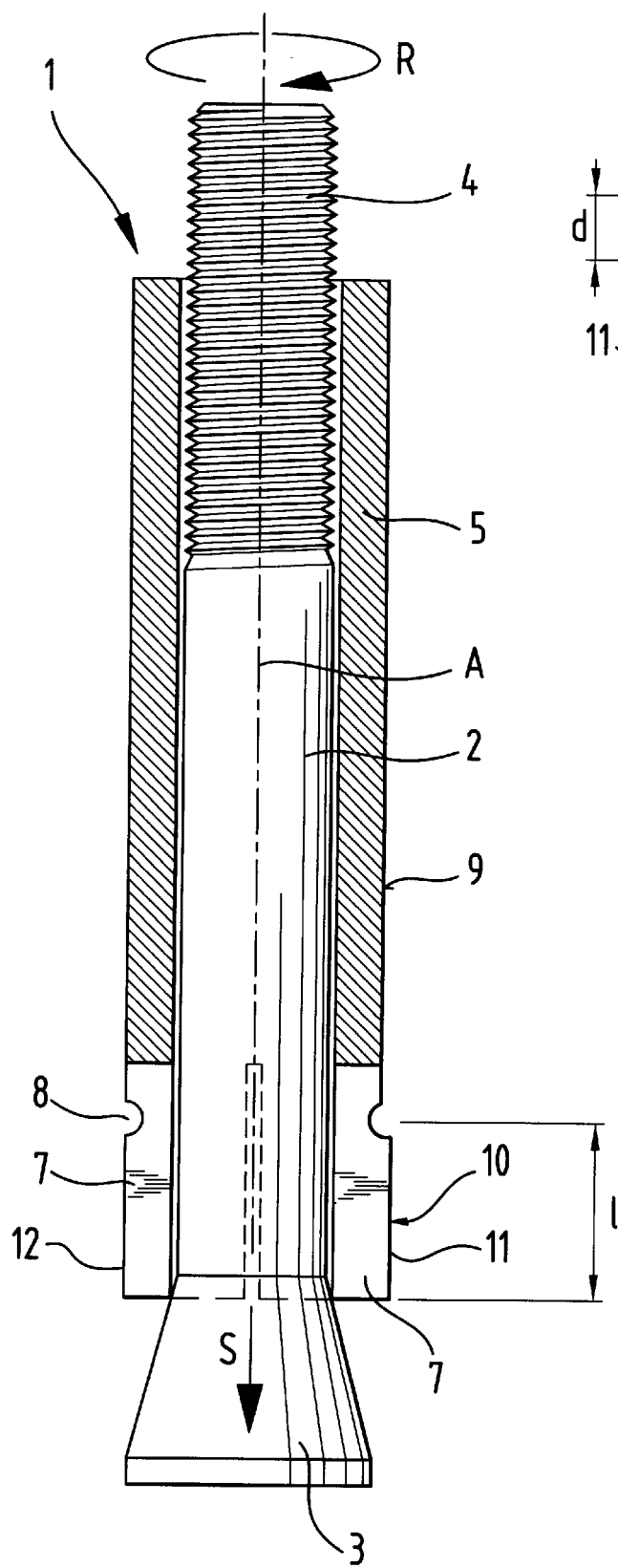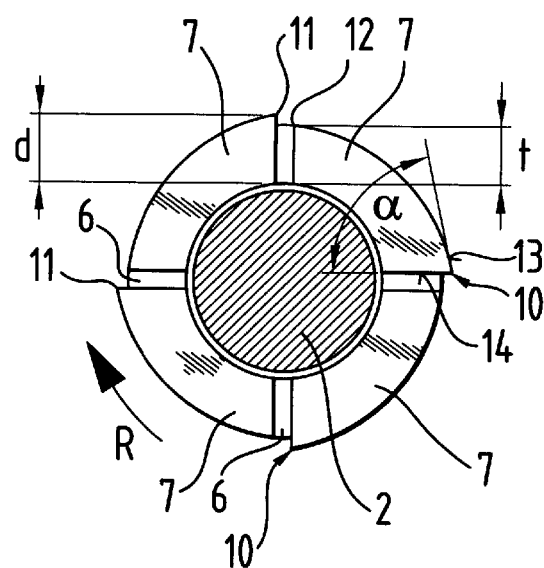

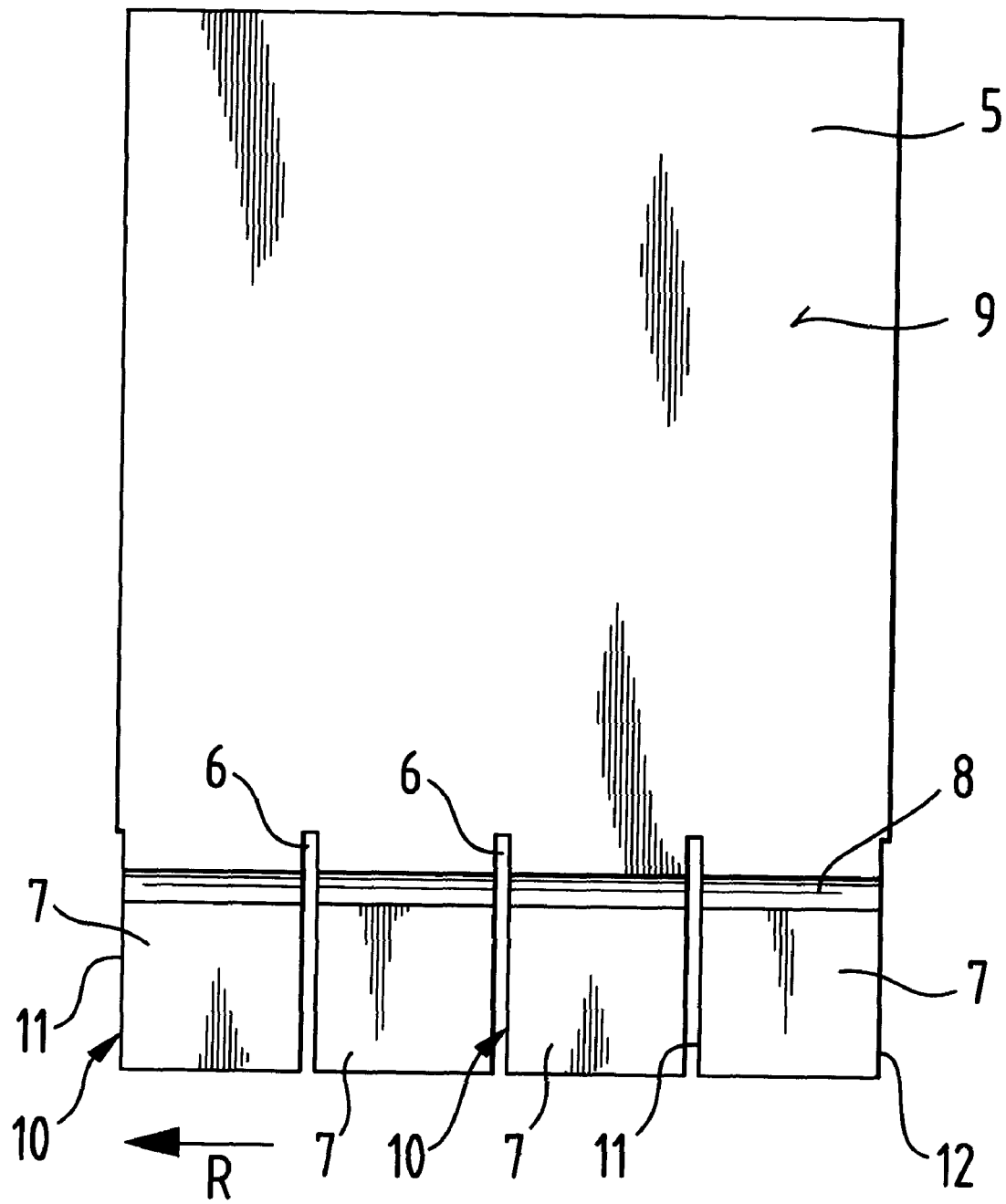

SELF-CUTTING DOWEL

BACKGROUND OF THE INVENTION

1. Field of the Invention

The present invention relates to a self-cutting dowel including a dowel rod having a head portion which widens in a setting direction, and a sleeve displaceable along the dowel rod and having, at its end adjacent to the head portion a plurality of expansion tabs separated by longitudinal slots, with the sleeve being displaceable onto the head portion upon radial expansion of the expansion tabs, and with the sleeve being provided with at least one cutter for forming an undercut in a ground during a dowel setting process, upon rotation of the sleeve.

2. Description of the Prior Art

In anchoring technology, it is often necessary to form connections which are expansion pressure-free to the greatest possible extent. In particular, with small edge and axis distances, the anchoring with conventional expansion dowels can result in fracture or even in stratification of the subsoil or the ground. To prevent this, there are provided anchoring systems in which a special connection or anchoring element is form-lockingly anchored in a receiving bore. To this end, a cylindrical receiving bore is provided at a predetermined depth with an undercut. An anchoring element, which is inserted in the pre-formed bore, includes an anchor rod provided with a head portion widening in a setting direction and extending through a bore of an expansion sleeve which is displaced over the anchor rod. The sleeve is provided with expansion segments which expand into the undercut as a result of a relative movement of the sleeve and the anchor rod.

For forming the undercut in most cases a special tool is required, which includes an abrasive cutter which is eccentrically rotated in the receiving bore and with which the undercut in the receiving bore is milled out. Also are known self-cutting dowels which automatically form an undercut during a setting process. Such a self-cutting dowel is disclosed in U.S. Pat. No. 4,702,654. The self-cutting dowel, which is disclosed in U.S. Pat. No. 4,702,654, has a sleeve provided at its leading, in the setting direction, end with expansion tabs which extend from a plastically deformable hinge toward a widening conical head portion at the leading end of the anchor rod. The expansion tabs expand radially over the head portion, which is supported on the bottom of the receiving bore, upon displacement of the sleeve. The expansion tabs are equipped with pin-shaped cutters which are inserted into the outer surface of the expansion tabs. During rotation of the sleeve, the cutters, which project beyond the sleeve circumference, mill an undercut in a receiving bore upon expansion of the expansion tabs. The setting process of the dowel ends when the sleeve has been displaced axially by a required amount, and the expansion tabs have expanded by a predetermined extent.

The setting of the known self-cutting dowel is effected with a rotary percussion tool for percussive-rotably pushing the sleeve over the conically widening head portion. At that, substantially, only the percussion components of the tool are used effectively. In particular, upon encounter with metal, this leads primarily to compression of the encountered metal and, therefore, this known dowel often cannot completely expand. Moreover, the cutting pins, which are provided in the outer surfaces of the expansion tabs can become loose and fall out because of a high axial load resulting from axial percussion during the setting process.

Accordingly, an object of the present invention is to eliminate the drawbacks of the prior art dowels. A self-cutting dowel should be provided with which an undercut in a cylindrical bore can be effectively formed. The self-cutting dowel should permit a contact with a reinforcing metal. The danger of losing the cutting elements, which are provided on expansion tabs and with which an undercut is formed, should be eliminated.

SUMMARY OF THE INVENTION

These and other objects of the present invention, which will become apparent hereinafter, are achieved by providing at least one cutter on a leading, in a rotational direction, longitudinal edge of one of the expansion tabs and which extends at least along a portion of axial length of the one of the expansion tabs.

A self-cutting dowel according to the present invention includes an anchor or dowel rod having a head portion which widens in a setting direction, and a sleeve displaceable along the dowel rod and having, at its end adjacent to the head portion, a plurality of expansion tabs separate d by longitudinal slots. The sleeve is displaceable onto the head portion upon radial expansion of the expansion tabs. The sleeve has at least one cutter for forming an undercut in a ground during a dowel setting process upon rotation of the sleeve. The cutter is provided on a leading, in a rotational direction, longitudinal edge of one of the expansion tabs and extends at least along a portion of an axial extent of the one expansion tabs. The self-cutting dowel according to the present invention permits to effectively use both the percussion components and the rotary components of the rotary percussion tool during the setting process. By providing the cutter on the longitudinal edge and arranging it along a portion of the length of the edge, the load applied to the cutter is distributed over a greater area and, therefore, the danger of the cutter being sheared off or falling out is eliminated.

By arranging the cutter on the leading, in the rational direction, longitudinal edge of an expansion tab so that the cutter projects beyond the sleeve circumference by about 0.1 mm, up to 15% and, preferably, up to 10% of the sleeve diameter, and by providing an elongate cutter, a free angle is formed which facilitate removal of the milled-out material of the bore wall. This also insures that a contact with a reinforcing metal does not adversely affect the formation of the undercut and insures complete setting of the dowel.

In a preferred embodiment of the present invention, the cutter is formed by the leading edge of the expansion tab itself and which projects beyond the sleeve circumference. Because the leading edges of the expansion tabs form the cutters themselves, additional cutting elements, which are usually provided in the outer surface or in the regions of the expansion tabs, can be eliminated. This eliminates additional processes for mounting the cutting inserts during manufacturing of the self-cutting dowels, which reduces the manufacturing costs. The danger of losing of a cutting insert is completely eliminated.

The projecting longitudinal edges can, e.g., be formed by pivoting the expansion tabs about the longitudinal axis of the dowel. However, it is advantageous when an expansion tab, which is limited by two longitudinal slots, has a wall thickness, at least along a portion of its axial extent, which increases toward the leading edge. This formation of the tabs can be achieved by machining, cold deformation and the like. The ratio of wall thicknesses of the expansion tab at leading and trailing edges can amount from about 1:0.9 to about 1:0.1. At these ratios of respective wall thicknesses, a desired protrusion of the cutter can be achieved, without any substantial influence of the process of milling the undercut in the bore wall on the form stability of the expansion tab, despite the relatively large gravitational forces generated during the milling process.

The cutter is harder than the sleeve from about 1,5 times to about 8 times and, advantageously, from about 2 times to about 6 times. In this way, good cutting characteristics are obtained. Such ratio of the hardnesses of the cutter and the sleeve, also permits to optimally control the wear of the cutter in such a way that at the end of the setting process, the cutter becomes almost completely worn off and hardly has any protrusion. This insures a complete abutment of the expansion tabs against the soil upon application of a load to the dowel. This insures a good force transmission between the head portion of the dowel rod, the expansion tabs and the ground in the region of the undercut.

In order to improve the material removal characteristics, the expansion tab is so designed that the flanks of the leading edge form therebetween, in the cutter region, an angle from about 30° to about 150°. At that, an angle of less than 90° favorably influences cutting characteristics of the cutter when it contacts a reinforcing metal. With an angle of greater than 90°, the removal of material in a circumferential direction is improved.

To increase the removal power and to reduce the required setting time, advantageously several cutters are provided. The number of cutters can be less than or equal to the number of expansion tabs. Thus, with, e.g., up to 10 expansion tabs, from 1 to 10 cutters can be provided.

When several cutters are used, preferably, the angles, which are formed by flanks of leading edges of expansion tabs, in the regions of the cutters, differ at least partially. At that, it is advantageous when a cutter with an angle less than 90° follows a cutter with an angle greater than 90°.

The cutters can be formed by machining or by cold deformation. However, it is more cost-effective when the self-cutting dowel according to the present invention is formed with a sleeve formed of stamped sheet metal part. The special geometry of the expansion tabs with partially protruding leading edges can be obtained, e.g., by transverse rolling of the uncoiled part, with subsequent bending of the blank to form the sleeve.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 1 shows an axial cross-sectional view of a self-cutting dowel according to the present invention;

FIG. 2 shows a cross-sectional view of the self-cutting dowel in a direction transverse to the axial direction in the region of expansion tabs of the expansion sleeve;

FIG. 3 shows a plan view of a stamped sheet metal part in an uncoiled condition for the expansion sleeve; and FIG. 4 shows a view similar to that of FIG. 2 and illustrating angles between cutter flanks on the leading longitudinal edge of the cutter.

DETAILED DESCRIPTION OF THE PREFERRED EMBODIMENTS

A self-cutting dowel 1 with undercut-forming means according to the present invention, which is shown in FIG. 1, includes a dowel rod 2 having a head portion 3 which widens in the insertion direction S. The head portion 3 is formed, e.g., as shown in FIG. 1, as a cone stub. However, instead of a cone surface, the head portion 3 can be formed with a concave surface. The end portion of the dowel rod 2 opposite to the head portion is provided with an outer thread 4 which functions as a load-receiving element. A sleeve 5 is displaceably supported on the dowel rod 2. The sleeve 5 has, in its portion adjacent to the head portion 3 of the dowel rod 2, a plurality of expansion tabs 7 which are separated from each other by axially extending slots 6. The expansion tabs 7 are separated from the remaining portion of the sleeve 5 by a plastically deformable hinge 8. The plastically deformable hinge 8 can be formed as, e.g., is shown in the drawings, by a circumferential groove provided on the sleeve outer surface 9 and extending transverse to the dowel axis A. The expansion tabs 7 have an axial length defined by a distance between the plastically deformable hinge 8 and a front end surface of the sleeve 5. As a result of relative movement between the sleeve 5 and the dowel rod 2, the expansion tabs 7 expand, and the sleeve 5 is displaced onto the head portion 3.

To form an undercut in an already formed cylindrical bore, a groove should be formed, e.g., by milling at a certain depth of the bore in the bore wall. To this end, the sleeve 5 is provided in the region of the expansion tabs 7 with at least one cutter 10. In the embodiment of the self-cutting dowel shown in FIG. 1, there are provided a plurality of cutters 10. In one preferred embodiment of the present invention, the number of cutters correspond to the number of expansion tabs. In the embodiment of the dowel shown in the drawings, the cutters 10 are provided on leading, in the rotational direction R, longitudinal edges 11 of the expansion tabs 7 and extend at least along a portion of the length 1 of the expansion tabs 7. Advantageously, the cutters 10 extend along the entire length of the longitudinal edges 11 of the expansion tabs 7, as shown in FIG. 1. The cutters 10 project beyond the outer surface 9 of the sleeve 5 by at least about 0.1 mm. The projection of the cutters 10 beyond the outer surface 9 depends on the sleeve diameter and amounts maximum to about 15% and, preferably, to about 10% of the sleeve diameter. Upon rotation of the sleeve 5 and the sleeve displacement onto the head portion 3, the cutters 10 are pressed against the bore wall. For bores having small diameters, cutters, which do not project beyond the sleeve circumference, can be provided. This insures simple setting of the dowel. The milling of the undercut is effected by rotation of the sleeve 5.

The cutters 10 can be formed as hard metal thin plates secured on the leading longitudinal edges 11 of the expansion tabs 7. According to the advantageous embodiment of the present invention, which is shown in FIGS. 1–2, the cutters 10 are formed by the leading longitudinal edges 11 of the expansion tabs 7. In the embodiment shown, the longitudinal edges 11 project beyond the circumference of the sleeve 5. This can be achieved, e.g., by plastically twisting of the expansion tabs 7 during manufacture. In the embodiment of the self-cutting dowel 1 shown in the drawings, the wall thickness of the expansion tabs 7 increases from the trailing, in the rotational direction R, edge 12 toward the leading edge 11. The ratio of the wall thickness d of the expansion tab 7 at the leading longitudinal edge 11 to the wall thickness at the trailing edge 12 is from about 1:0.9 to about 1:0.1.

As discussed, the cutters 10, which are provided on the longitudinal edges 11 of the expansion tabs 7 of the sleeve 5, project beyond the circumference of the sleeve 5. To provide for cutting action of the cutters 10, the flanks 13, 14 on the leading longitudinal edge 11 form therebetween an angle from about 30° to about 150°. At that, an angle of less than 90°, particularly favorably influences the cutting function of the cutter 10 when it cuts into a reinforcing metal. Advantageously, the cutting tabs 7 are so arranged that an expansion tab 7 with a protruding leading longitudinal edge 11 and an angle α less than 90° follows an expansion tabs 7 with a leading edge 11 having an angle α' greater than 90°, as shown in FIG. 4.

The cutters 10 are advantageously so formed that during the milling of the bore wall, they wear off. In particular, at the end of a setting process, they should wear off to such an extent, that a complete abutment of the outer surface 9 of the expansion tabs 7 with the bore wall is insured. This improves the force transmission between the head portion 3, the expansion tab 7 and the bore wall. To this end, advantageously, the hardness of the cutters 10 is so selected that it is greater than the hardness of the sleeve 5 from about 2 to about 8 times and, preferably, from about 2 to 6 times. In case, which is shown in FIGS. 1–2, with the cutters 10 being formed by the leading edges 11 of the expansion tabs 7, the minimal stability of the cutters 10 is provided by hardening or tempering.

The sleeve 5 with expansion tabs 7 and cutters 10, which are formed on leading longitudinal edges 11 can be manufactured by using machining processes. However, advantageously, the sleeve 5 is formed of a stamped sheet metal part which is shown in FIG. 3 in an uncoiled condition. The required sleeve geometry in the region of the protruding expansion tabs 7, with the wall thickness uniformly increasing toward the leading longitudinal edges 11, can be obtained, e.g., with transverse rollers.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of

What is claimed is:

1. A self-cutting dowel, comprising a dowel rod (2) having a head portion (3) which widens in a setting direction (S); and a sleeve (5) displaceable along the dowel rod (2) and having, at an end thereof adjacent to the head portion (3) a plurality of expansion tabs (7) separated by longitudinal slots (6), the sleeve (5) being displaceable onto the head portion (3) upon radial expansion of the expansion tabs (7), and the sleeve (5) being provided with at least one cutter (10) for forming an undercut in a ground during a dowel setting process upon rotation of the sleeve (5), the at least one cutter (10) being provided on a leading, in a rotational direction (R), longitudinal edge (11) of one of the expansion tabs (7) and extending at least along a portion of axial length (1) of the one of the expansion tabs (7), wherein a ratio of the wall thickness (d) of the one of the expansion tabs (7) at the leading longitudinal edge (11) thereof to a wall thickness (t) at a trailing longitudinal edge (12) thereof is from about 1:0.9 to about 1:0.1.

2. A dowel according to claim 1, wherein the at least one cutter (10) projects beyond a circumference of the sleeve (5) at least by about 0.1 mm.

3. A dowel according to claim 1, wherein the at least one cutter (10) projects beyond a circumference of the sleeve by (5) up to 15% of a diameter of the sleeve (5).

4. A dowel according to claim 3, wherein the at least one cutter (10) projects beyond a circumference of the sleeve (5) by up to 10% of the diameter of the sleeve (5).

5. A dowel according to claim 1, wherein the at least one cutter (10) is formed by the leading longitudinal edge (11) of the one of the expansion tabs (7).

6. A dowel according in claim 1, wherein the at least one cutter (10) projects beyond an outer surface (9) of the sleeve (5) and is harder than the sleeve (5) from about 1.5 to about 8 times.

7. A dowel according to claim 6, wherein the at least one cutter (10) is harder than the sleeve (5) from about 2 to about 6 times.

8. A dowel according to claim 1, wherein flanks (13, 14) of the leading longitudinal edge (11) form, in a region of the cutter (10), and angle (α) from about 30° to about 150°.

9. A dowel as set forth in claim 1, wherein the sleeve (5) is formed as a coiled sheet metal stamped part.

10. A self-cutting dowel, comprising a dowel rod (2) having a head portion (3) which widens in a setting direction (S); and a sleeve (5) displaceable along the dowel rod (2) and having, at an end thereof adjacent to the head portion (3) a plurality of expansion tabs (7) separated by longitudinal slots (6), the sleeve (5) being displaceable onto the head portion (3) upon radial expansion of the expansion tabs (7), the sleeve (5) being provided with at least one cutter (10) for forming an undercut in a ground during a dowel setting process upon rotation of the sleeve (5), the at least one cutter (10) being provided on a leading, in a rotational direction (R), longitudinal edge (11) of one of the expansion tabs (7) and extending at least along a portion of axial length (1) of the one of the expansion tabs (7), wherein the sleeve (5) is provided with a plurality of cutters (10) formed on respective leading edges (11) of respective expansion tabs (7), wherein a number of cutters (10) is one of less than a number of expansion tabs (7) and equal to the number of expansion tabs (7), wherein flanks (13, 14) of the respective leading edges form, in regions of respective cutters (10) different angles, and wherein the expansion tabs (7) are so arranged that a cutter (10) having an angle (α) less than 90° follows a cutter (10) having an angle (α') of more than 90°.

* * * * *